United States Patent
Sugiyama et al.

(10) Patent No.: US 6,894,839 B2
(45) Date of Patent: May 17, 2005

(54) ILLUMINATION OPTICAL SYSTEM AND LASER PROCESSOR HAVING THE SAME

(75) Inventors: Yoshikazu Sugiyama, Yokohama (JP); Miyuki Masaki, Tokyo (JP); Takehito Yagi, Odawara (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 41 days.

(21) Appl. No.: 10/081,975

(22) Filed: Feb. 22, 2002

(65) Prior Publication Data

US 2002/0163730 A1 Nov. 7, 2002

(30) Foreign Application Priority Data

Feb. 22, 2001 (JP) ................................. P2001-046984
Mar. 22, 2001 (JP) ................................. P2001-083562

(51) Int. Cl.$^7$ ............................................. G02B 27/10
(52) U.S. Cl. ................... 359/618; 359/798; 359/799; 359/800
(58) Field of Search .............................. 359/618, 639, 359/799, 800, 798, 813, 822, 823, 640, 641, 619, 622, 623, 624

(56) References Cited

U.S. PATENT DOCUMENTS

| | | | | |
|---|---|---|---|---|
| 4,974,919 A | * | 12/1990 | Muraki et al. | 359/204 |
| 5,453,814 A | * | 9/1995 | Aiyer | 355/70 |
| 5,724,122 A | * | 3/1998 | Oskotsky | 355/67 |
| 5,852,508 A | | 12/1998 | Kubota et al. | |
| 6,183,094 B1 | * | 2/2001 | Ohta | 353/38 |
| 6,377,336 B1 | * | 4/2002 | Shiraishi et al. | 355/67 |
| 6,393,042 B1 | * | 5/2002 | Tanaka | 372/101 |
| 6,467,911 B1 | * | 10/2002 | Ueyama et al. | 353/87 |

FOREIGN PATENT DOCUMENTS

| | | |
|---|---|---|
| CN | 2249724 | 5/1997 |
| JP | 61-75523 | 4/1986 |
| JP | 10-153746 | 6/1998 |
| JP | 10-314970 | 12/1998 |
| JP | 11-16851 | 1/1999 |
| JP | H10-244392 | 9/1999 |

* cited by examiner

Primary Examiner—Ricky Mack
Assistant Examiner—Brandi N Thomas
(74) Attorney, Agent, or Firm—Fish & Richardson P.C.

(57) ABSTRACT

An illumination optical system has superior image formation capabilities, and can radiate a linear beam with excellent illumination uniformity and a narrow line width having a large aspect ratio; the illumination optical system comprises an afocal beam expander system which expands an beam illuminated from a laser light source; a linear beam-forming lens system having at least refractive power in a second direction which is substantially at a right angle to at least a first direction, the linear beam-forming lens system converting the beam, illuminated from said beam expander system, to a linear beam having its long side in said first direction; a lens array section having a plurality of element lenses, arranged along said first direction; and a condenser optical system which illuminates a processed face by reconnecting images of said linear beam from each of said element lenses thereon.

14 Claims, 8 Drawing Sheets

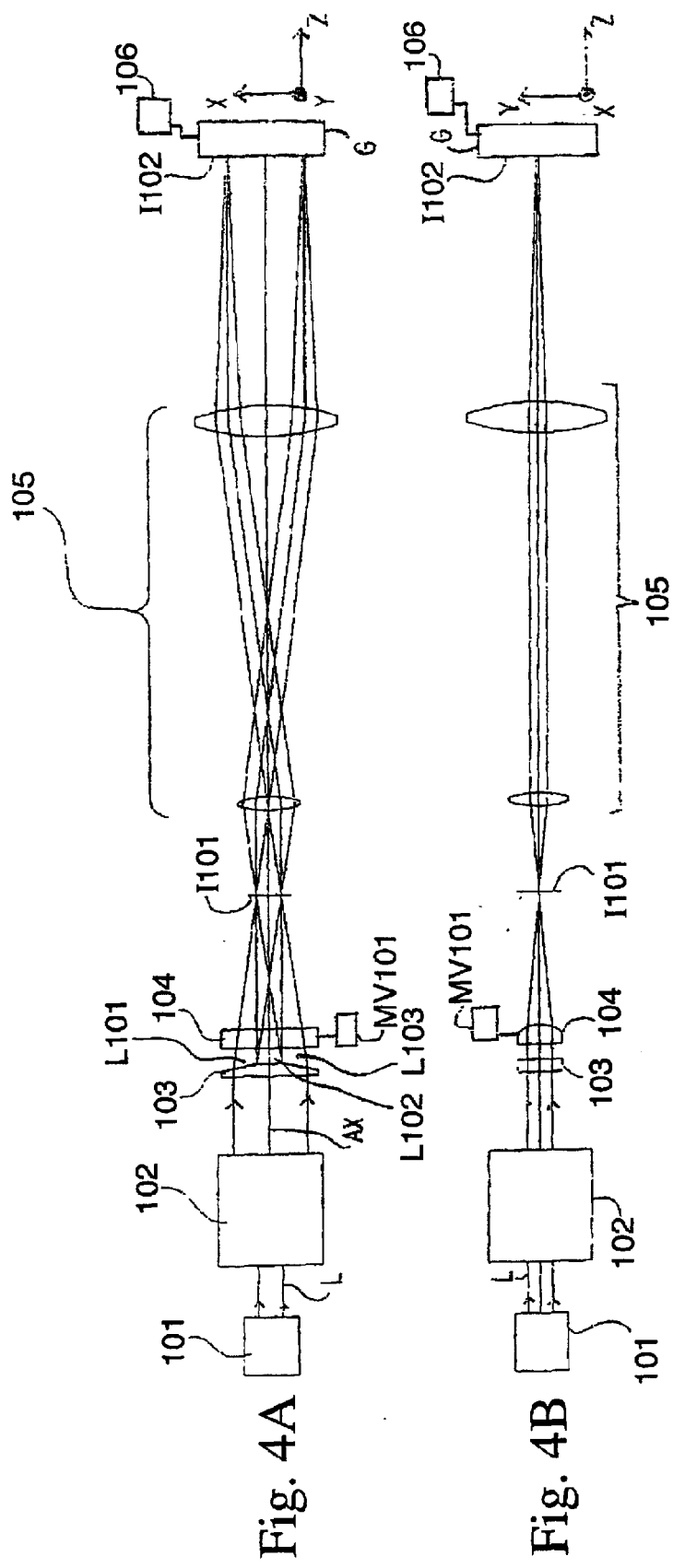

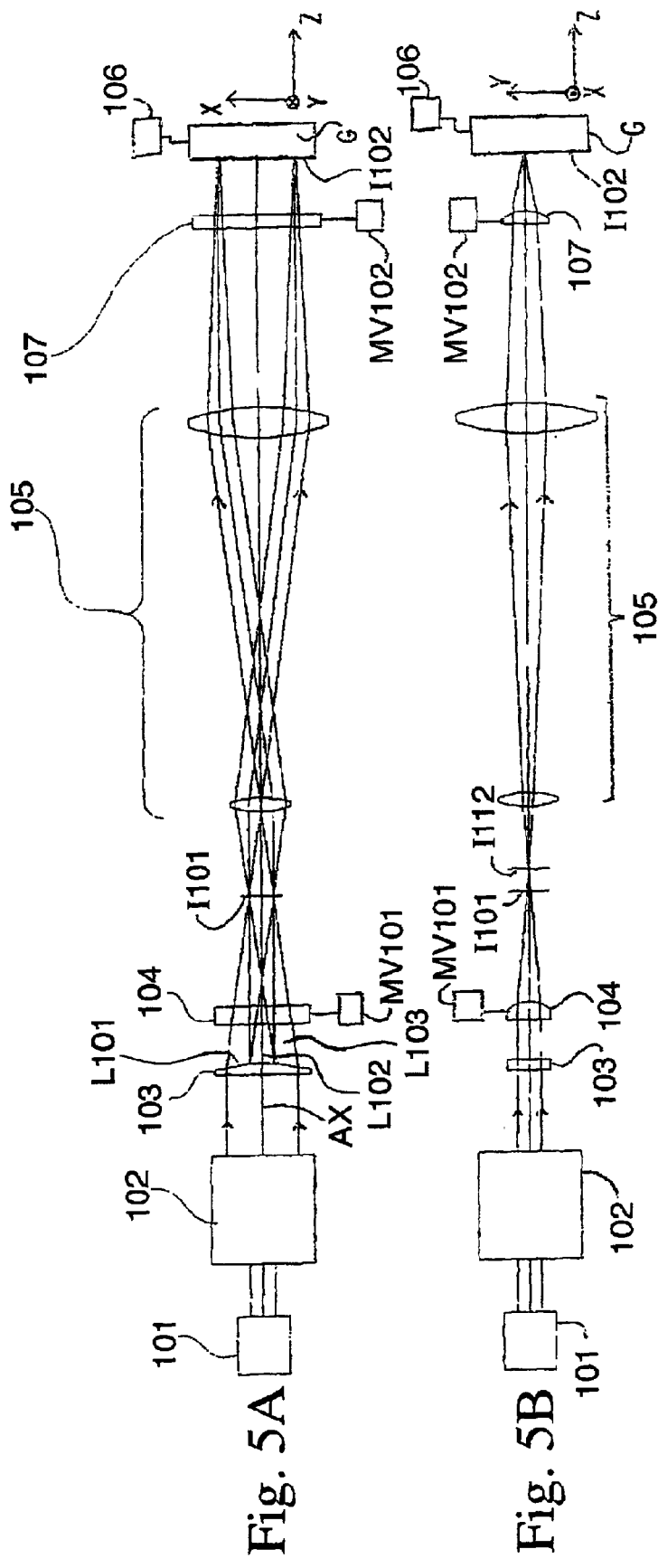

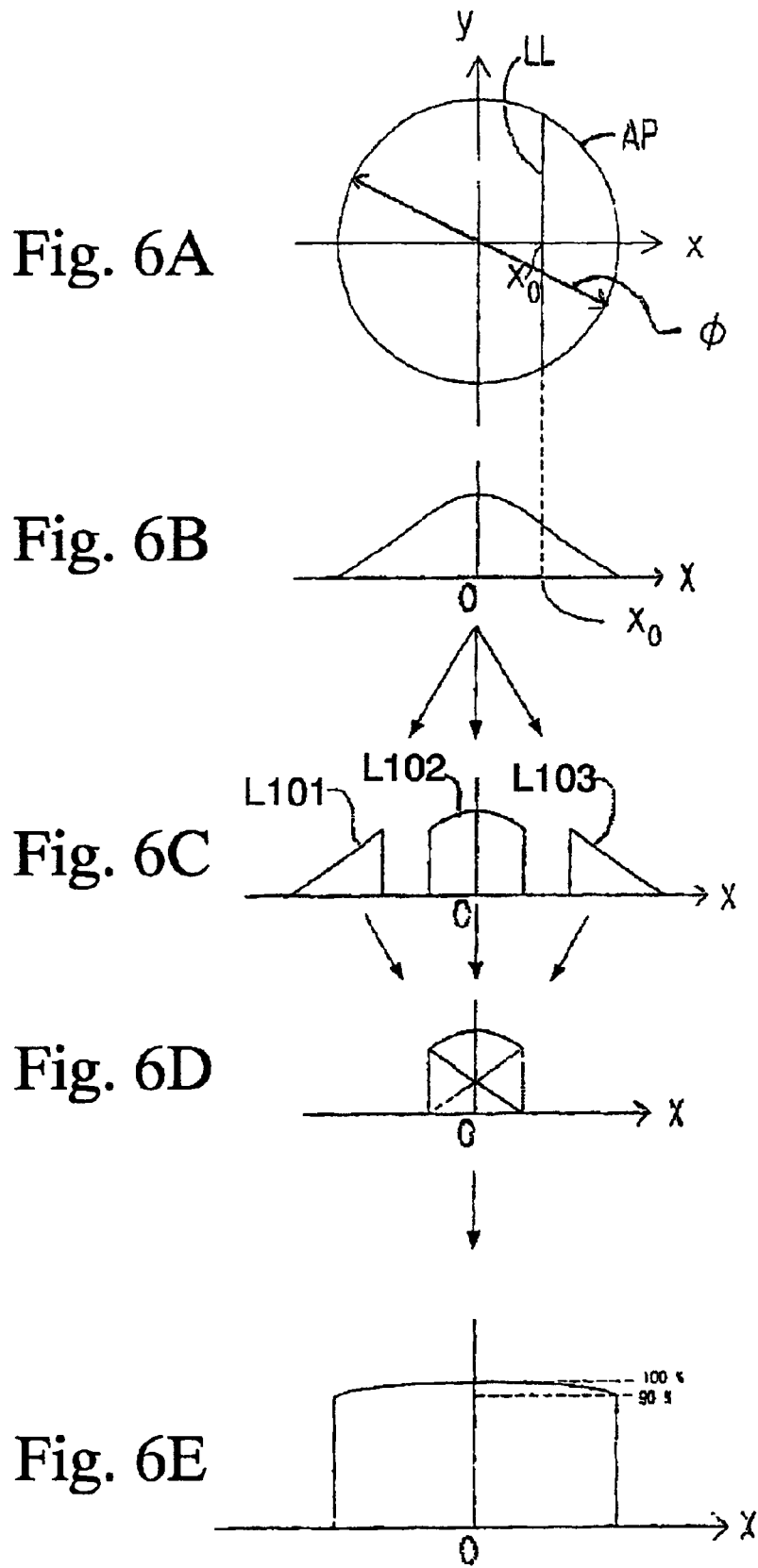

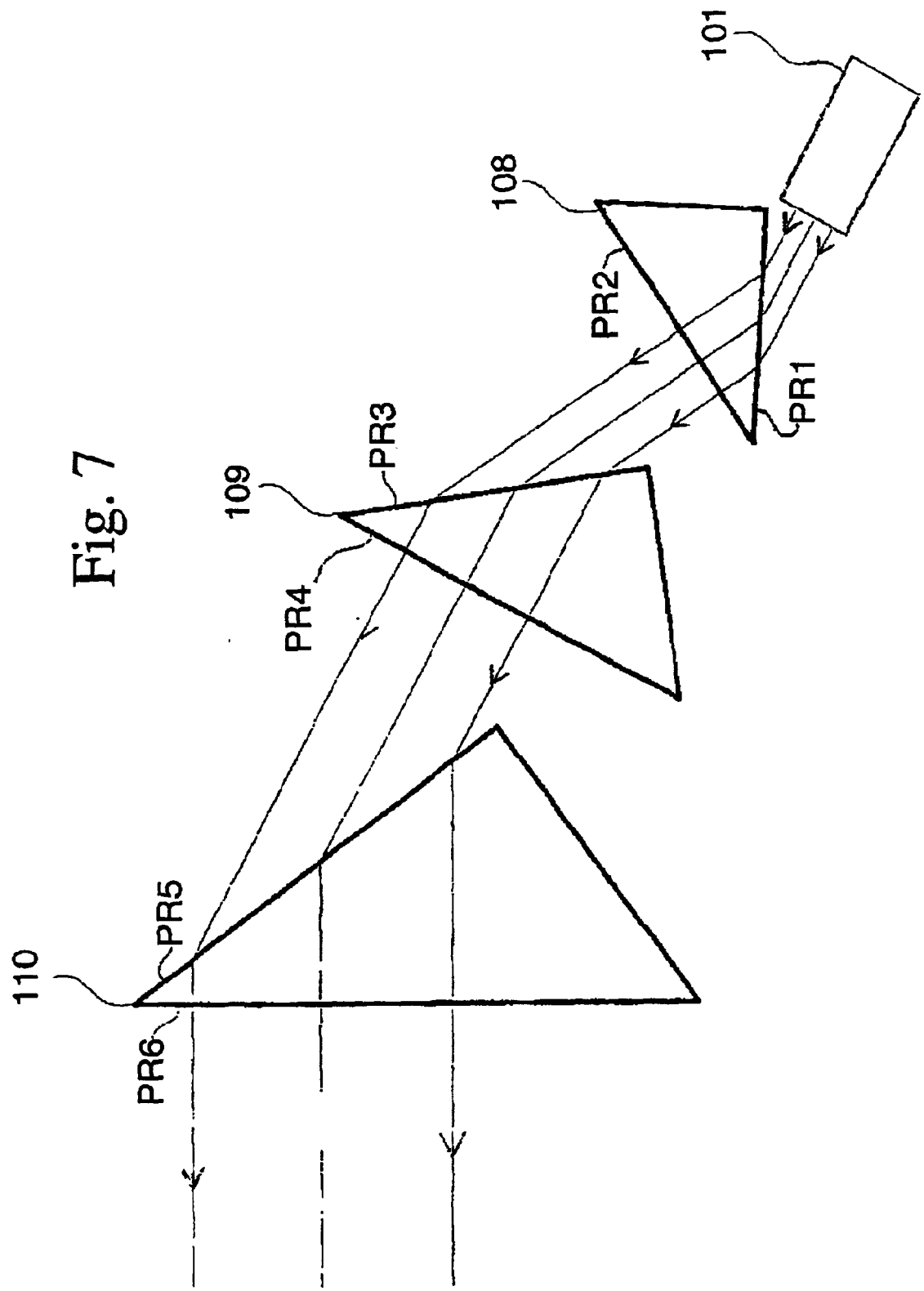

ILLUMINATION OPTICAL SYSTEM AND LASER PROCESSOR HAVING THE SAME

BACKGROUND OF THE INVENTION

1. Field of the Invention

The present invention relates to an illumination optical system which is suitable for anneal processing of a glass substrate and the like, and a laser processor incorporating the optical system.

2. Description of the Related Art

One conventional crystallizing technique is performed by radiating laser light onto an amorphous silicon film. There is another technique of radiating laser light in order to repair the crystal properties of the silicon film, which is damaged by the injection of impurity ions, or to revitalize injected impurity ions. This is called a laser anneal method.

One characteristics of laser anneal processing is that there is almost no heat damage to the substrate. This characteristic of causing no heat damage to the substrate is useful when, for example, providing a semiconductor element on a substrate having low heat-resistance, such as glass.

Recently, a glass substrate is preferably used as the substrate in a liquid crystal display, and in particular in a liquid crystal display for moving images, in view of cost concerns and the demand for a larger area. When using the laser anneal method, even when the substrate comprises a glass having low heat-resistance, there is almost no heat damage to the glass substrate. Therefore, it is possible to construct a semiconductor element such as a thin-film transistor comprising a crystallized silicon film, even when using a glass substrate. Consequently, in the future, the laser anneal method is expected to be an important technological feature in the construction of semiconductor circuits on glass substrates.

Most glass substrates with a semiconductor circuit or the like mounted thereon have a comparatively large area. In contrast, the beam radiation area of laser light immediately after emission from the light source is small. For this reason, the shape of the beam is made square or linear, and a predetermined region is scanned. For example, a linear beam of light is moved perpendicular to its long side and scans the glass substrate. By this method, anneal processing of the entire glass substrate can be completed in a comparatively short time.

An optical system for making a linear beam used in such laser anneal processing is disclosed in, for example, Japanese Unexamined Patent Application, First Publication No. 10-244392. In Japanese Unexamined Patent Application, First Publication No. 10-244392, a laser beam is made linear by using an optical system known as a homogenizer. The homogenizer is required to make a linear beam having extremely uniform illumination and shape. In the above publication, a multi-cylindrical lens system comprising a plurality of cylindrical lenses is used as the homogenizer. The homogenizer plays a central role in ensuring that the illumination of the beam is uniform.

In the multi-cylindrical lens system, strip-like cylindrical lenses are arranged in a row parallel to the direction of their refractive power. In the same manner as a fly-eye lens used in conventional uniform illumination, a bundle of rays, radiated into the multi-cylindrical lens system, is split by the cylindrical lenses and focused into a linear shape. As a result, the number of linear images is the same as the number of cylindrical lenses.

These linear images become a plurality of new secondary light sources, which radiate light onto a sample via another cylindrical lens. The lights from the plurality of secondary light sources reconnect on the illuminated face of the sample, and are averaged. Therefore, the illumination distribution becomes uniform in the direction which the multi-cylindrical lens system is arranged in (the direction having refractive power).

Furthermore, in Japanese Unexamined Patent Application, First Publication No. 10-244392, two multi-cylindrical lens systems are used to make the illumination uniform in the direction parallel to the width of the linear beam as well as parallel to the length of the beam.

However, the following problems arise when using a large number of cylindrical lenses, as described in the above publication. Making a cylindrical lens is not as easy as a normal spherical-faced lens, and the manufacturing cost is higher. Furthermore, the shaping precision is greatly inferior to that of the normal spherical-faced lens. Considering the manufacture of an actual apparatus, there is a possibility that an optical system comprising a great number of cylindrical lenses will increase the manufacturing cost and fail to satisfy demands for high work precision.

The growing demand for large-scale liquid crystal displays has been accompanied by an increase in the area of the scanning region. Consequently, there is a demand for an even longer linear beam. When the length of the linear beam is increased while keeping its width constant, the illuminated area increases. Therefore, the energy density per area unit decreases. As a result, when the beam is radiated onto a sample, it is difficult to heat the sample to the temperature required for anneal processing. Accordingly, to increase the energy density when illuminating the sample, the long-side length of the beam need increase, also the width of the beam need be narrower.

Other reasons why a beam with a narrow width is needed are explained as follows. An excimer laser has high output power, and is widely used as a laser light source. However, the excimer laser is expensive, and the apparatus itself is large. For this reason, it is desirable to use a fixed laser, or a YAG laser, which is cheaper, smaller, and easier to handle, as the laser light source. The fixed laser and YAG laser have lower output energy than the excimer laser. Therefore, in order to increase the energy density on the illuminated face, the light must be focused to form a narrower beam. Consequently, not only the length of the beam need increase, also its width need be narrower.

As described above, the need for a linear beam with a narrow width requires an optical system with high image formation capability in the direction of the length of the linear beam. In view of the demand for this type of image formation capability, the specifications of the optical system disclosed in Japanese Patent Laid-Open No. 10-244392, mentioned above, are inadequate.

As described above, Japanese Unexamined Patent Application, First Publication No. 10-244392 uses two multi-cylindrical lens systems having a plurality of strip-like cylindrical lenses. The optical system following the multi-cylindrical lens systems is generally called a condenser lens, and similarly comprises a multi-cylindrical lens system.

Constructing the optical system using a group of cylindrical lenses in this way, and constructing the optical system from power apparatuses having different beam long-side directions and short-side directions, is believed to be an effective design method, making the apparatus easier for a designer to comprehend intuitively when creating a rectangular (linear) beam, However, in an optical system which combines cylindrical lenses with different directions of power, when a bundle of parallel rays enters, there is a light beam which travels in a different direction to the directions of power of the cylindrical lenses. The aberration of this light beam cannot easily be corrected by an optical system which simply combines power in intersecting directions. Therefore, this design method is not desirable when attempting to correct the aberration of the optical system to a high level.

For example, that the bundle of parallel light rays is assumed to be circular in cross-section. Then, a first cylindrical lens having negative (concave) power is provided, and a second cylindrical lens having positive (convex) power in a direction intersecting the power direction of the first cylindrical lens, is provided behind the first cylindrical lens (on the image side). Then it is assumed that the parallel light rays enter the first and second cylindrical lenses, and are focused into a linear shape.

In this case, the first cylindrical lens which has negative power disperses the light rays in one direction only. Then, the subsequent second cylindrical lens which has positive power focuses the dispersed light in a direction perpendicular to the direction of the dispersion. The light at the center of the dispersion, emitted from the negative first cylindrical lens, enters the positive second cylindrical lens at a perpendicular to the mother line of the second cylindrical lens. On the other hand, the light at the peripheral section of the dispersion, emitted from the first cylindrical lens, enters the second cylindrical lens at a diagonal to the mother line of the second cylindrical lens.

As a result, the central and peripheral light, emitted from the negative first cylindrical lens, have different focal positions after entering the positive second cylindrical lens. Consequently, when the image is formed in a linear shape, the width of the line at the center of the linear image is different from that at the periphery. Therefore, in an optical system comprising a cylindrical lens, this characteristic aberration of the cylindrical lens must be corrected.

Generally, optical designers are not familiar with the characteristic aberration of cylindrical lenses described above. The behavior of the light beam cannot be expressed simply in terms of one face in the short (short axis) direction of the beam and another face in the long (long axis) direction. It is extremely difficult to correct the characteristic aberration of the cylindrical lens with only a combination of cylindrical lenses with intersecting powers. Even if the aberration were to be corrected, the large number of cylindrical lenses required would be enormous.

As described above, when making a linear beam with a narrow width, an optical system which uses a large number of intersecting cylindrical lenses is not desirable from an optical design point of view.

The optical system disclosed in Japanese Unexamined Patent Application, First Publication No. 10-244392 has a constitution which maintains uniform illumination in the direction of the short side of the beam. However, this structure is not desirable for working a linear beam with a narrow width, for the following reasons.

Firstly, the need for uniform illumination along the width of the line will be explained. Increasing the illumination uniformity along the width of the line is effective when increasing the scanning speed of the linear beam. When the width in the scanning direction of the linear beam is wide, no matter how fast the scanning speed of the linear beam is , the total time for the linear beam to pass the unit area on the sample substrate and consequently becomes a long. The illumination time of the linear beam on the sample substrate is sufficient for a reaction such as crystallization to take place. Therefore, a wider linear beam enables the scanning speed to be increased, the anneal time can be shortened.

However, when the linear beam has poor illumination uniformity, energy decreases at the peripheral portions of the beam width. Consequently, when scanning the linear beam, there is no anneal reaction at the peripheral portions of the beam. This is equivalent to scanning a linear beam with a narrow width, and makes it impossible to increase the scanning speed.

As already mentioned, there is a recent demand for liquid crystal displays with a large area. Therefore, techniques for making large-area substrates are desirable in order to increase the manufacturing speed of the liquid crystal display. As described above, aberration should be corrected to a high degree in order to reduce the width of the linear beam. It is extremely difficult to make a linear beam with a narrow width after aberration has been corrected to a high degree, while maintaining highly uniform illumination in the short (width) direction of the linear beam. Therefore, there is a demand for an optical system which is specially designed to obtain highly uniform illumination in the long direction of the linear beam, and to reduce the width in the short direction of the linear beam. For this point of view, the optical system disclosed in Japanese Unexamined Patent Application, First Publication No. 10-244392 cannot be regarded as adequate.

Furthermore, in an optical system which emits laser light over an extremely large scanning range, it is very difficult to increase the number of apertures (NA) in the optical system on the emission side. This causes diffraction, so that optical considerations alone are not sufficient to analyze the uniform illumination of the linear beam. Moreover, the optical system mentioned above uses a multi-cylindrical lens system to increase the illumination uniformity in the short direction of the linear beam. As already mentioned, the function of this lens system is to split the beam emitted from a light source in the direction of its width, and reconnect linear images, formed by the split beams, on an illuminated face. Therefore, when the width of the linear images of the illuminated face become narrow, the reconnection precision of the linear images must be made smaller than the linear image width. In other words, the precise reconnection of the linear image becomes more difficult as the required line width becomes narrower. Therefore, when consideration is also given to the manufacture of the laser processor, even when some of the uniformity of the illumination distribution of the linear image on the illuminated face can be sacrificed, it is still preferable to reduce the number of split beams. By slightly reducing the speed of the annealing work, the illumination uniformity of the linear image parallel to its width can be reduced and the number of split beams can be reduced; thus, this is desirable with regard to manufacturing the apparatus.

The present invention has been realized in consideration of the problems described above. It is an object of this invention to provide an illumination optical system which has superior image formation capabilities, and can radiate a linear beam with excellent illumination uniformity and a narrow line width having a large aspect ratio. It is another object of this invention to provide an inexpensive, easily manufactured laser processor which can process a large area at high speed.

SUMMARY OF THE INVENTION

In order to achieve the above objects, the present invention provides an illumination optical system comprising an afocal beam expander system 2 which expands an beam illuminated from a laser light source 1; a linear beam-forming lens system 3 having at least refractive power in a second direction y which is substantially at a right angle to at least a first direction x, the linear beam-forming lens system converting the beam, illuminated from the beam expander system, to a linear beam having its long side in the first direction x; a lens array 4 having a plurality of element lenses EL11, EL12, EL13, EL21, EL22, and EL23, arranged along the first direction x; and a condenser optical system 5 which illuminates a processed face 12 by reconnecting images of the linear beam from each of the element lenses thereon.

In a preferred aspect of this invention, the linear beam-forming lens system 3 comprises a cylindrical lens 3 having refractive power in the second direction y.

In a preferred aspect of this invention, at least one of the cylindrical lens 3, the lens array 4, and the condenser optical system 5 is movable along an optical axis.

In a preferred aspect of this invention, the lens array 4 has at least a first sub array section LA1 and a second sub array section LA2; the element lenses EL11, EL12, EL13, EL21, EL22, and EL23 are rotationally symmetrical; and the first sub array section LA1 and the second sub array section LA2 are arranged so that the optical axes AX11 and AX12, AX, AX13 and AX23 of the element lenses EL11 and EL21, EL12 and EL22, EL13 and EL23, corresponding to the sub array sections LA1 and LA2, substantially match each other.

In another preferred aspect of this invention, the condenser optical system 5 comprises, on the side of the processed face 12, another cylindrical lens having refractive power in the second direction y.

The present invention further provides a laser processor comprising a laser light source 1 which supplies laser light; the illumination optical system according to one of the aspects described above; and a scanning-moving section 6 which moves the illuminated linear beam and the processed face 12 in relation to each other.

In a preferred aspect of this invention, an illumination optical system comprises a prism member 103 which splits a beam, illuminated from a laser light source 101, into a plurality of light beams in a first direction (x direction) and reconnects the plurality of light beams on a predetermined face I101; a linear beam-forming lens system 104 having at least refractive power in a second direction (y direction) which is substantially at a right angle to the first direction (x direction), the linear beam-forming lens system 104 converting the plurality of split light beams to a linear beam having its long side in the first direction x; and an expanding optical system 105 which expands the linear beam in the first direction (x direction), and illuminates it onto a processed face I102.

In a preferred aspect of this invention, the prism member 103 comprises a trapezoid prism, and the position of the predetermined face I101, where the plurality of light beams, split by the trapezoid prism 103, are connected, substantially matches the focal positions I101 and I102 of the linear beam-forming lens system in the second direction (y direction).

In preferred aspect of this invention, the expanding optical system 105 comprises an optical system which is rotationally symmetrical to an optical axis AX.

In preferred aspect of this invention, the linear beam-forming lens system 104 comprises a first cylindrical lens 104 having refractive power in the second direction (y direction).

In preferred aspect of this invention, the expanding optical system 105 comprises, on the side of the processed face I102, a second cylindrical lens 107 having refractive power in the second direction (y direction).

In preferred aspect of this invention, at least one of the first cylindrical lens 104 and the second cylindrical lens 107 is movable along an optical axis AX.

In preferred aspect of this invention further comprising a beam expander system 102 which expands the diameter of the beam, illuminated from the laser light source 101, more greatly in the first direction (x direction) than in second direction (y direction).

A laser processor of this invention comprises the illumination optical system according to one of the aspects described above, and a scanning-moving section 106 which moves the linear beam and the processed face I102 in relation to each other.

Incidentally, in to facilitate understanding of this invention, diagrams of preferred embodiments of the invention are used in the description of means for achieving the above objects to explain of the constitution of this invention, but this invention is not limited to these embodiments.

As described above, this invention makes it possible to provide an illumination optical system which has superior image formation capabilities, and can radiate a linear beam with excellent illumination uniformity and a narrow line width having a large aspect ratio

BRIEF DESCRIPTION OF THE DRAWINGS

FIGS. 4A and 4B are views showing the schematic constitution of a laser processor according to a third embodiment;

FIGS. 5A and 5B are views showing the schematic constitution of a laser processor according to a fourth embodiment;

FIGS. 6A to 6E are views illustrating effects of reconnection;

FIG. 7 is a view showing the constitution of a beam expander; and

DETAILED DESCRIPTION OF THE INVENTION

Preferred embodiments of the present invention will be explained with reference to the accompanying drawings.

First Embodiment

Figure 1:
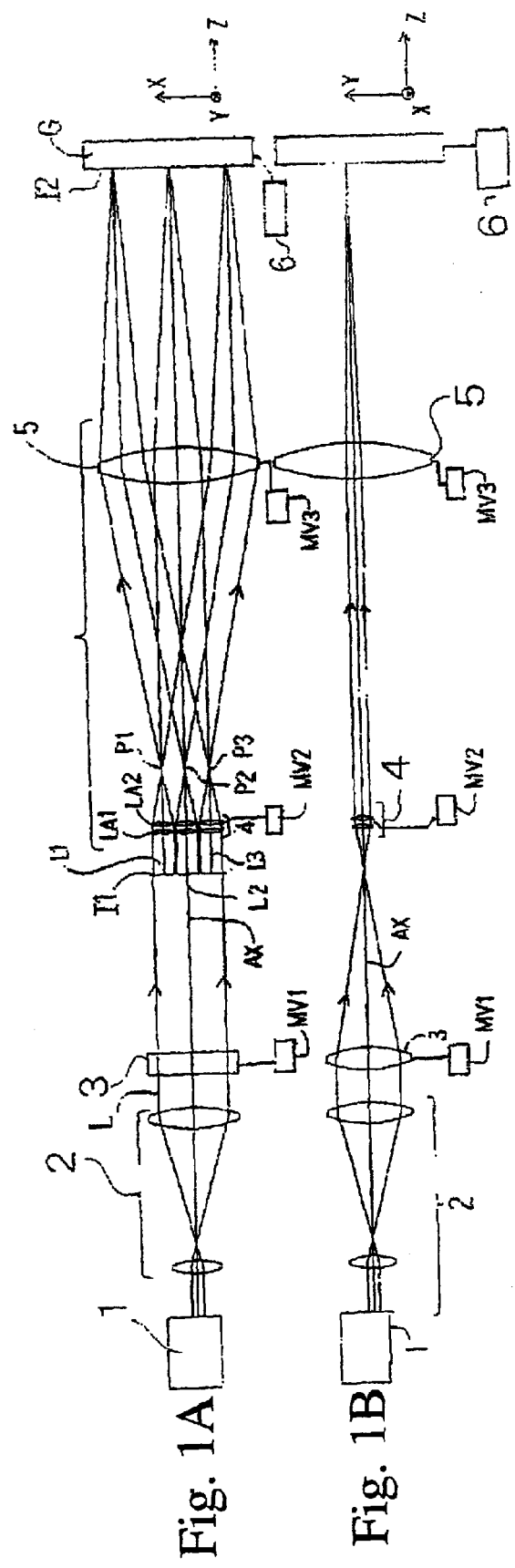
FIGS. 1A and 1B are views showing the schematic constitution of a laser processor according to a first embodiment.

FIGS. 1A and 1B show a schematic constitution of a laser processing apparatus according to a first embodiment. A fixed laser 1 emits a laser beam which is substantially circular in cross-section, and an afocal beam expander 2 expands the ray bundle diameter of the beam, converting it to collimate light with a large diameter. The collimate light L is radiated to a cylindrical lens 3. The cylindrical lens 3 has no refractive power in the x direction (non-power face) and has positive refractive power in the y direction, which is substantially perpendicular to the x direction. Therefore, the light passes the cylindrical lens 3 and is focused on an intermediate image-forming face I1 into a line, the long side of this line being parallel to the x direction.

Here, the intensity distribution of the laser beam which is substantially circular in cross-section, emitted by the light source 1, has Gauss distribution. Since the circular beam is converted to a linear image by the cylindrical lens 3, the illumination is intense at the central section of the linear image but weak at the peripheral section. Therefore, the linear image formed on the intermediate image-forming face I1 is an uneven line having illumination distribution in the x direction.

Figure 3:
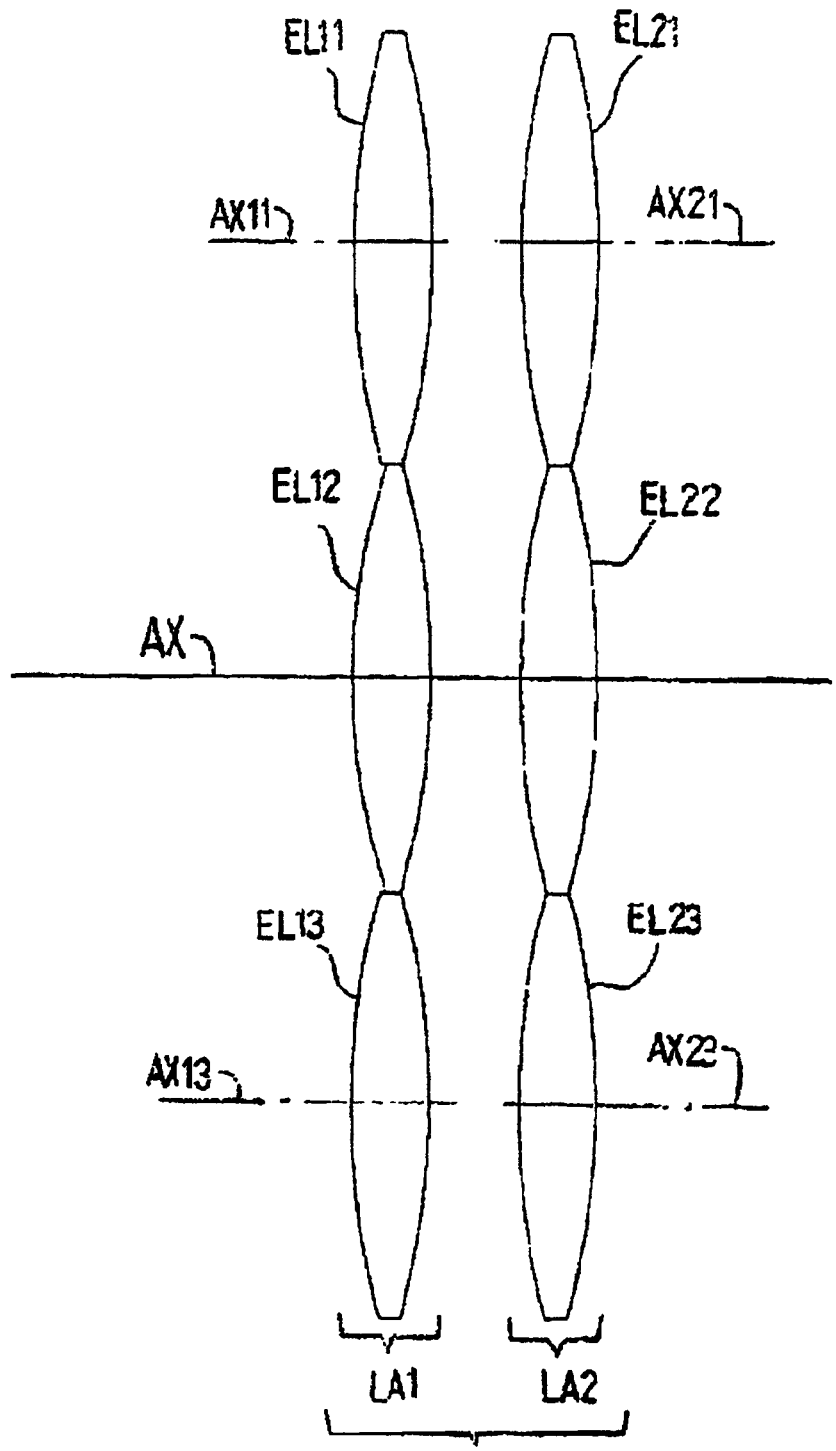
FIG. 3 is a views showing the constitution of a lens array.

A lens array 4 is provided at the final image side of the intermediate image-forming face I1, and comprises a first sub lens array section LA1 and a second sub lens array section LA2. FIG. 3 shows the constitution of the lens array 4. Since the constitutions of the first sub lens array section LA1 and the second sub lens array section LA2 are identical, only the first sub lens array section LA1 will be described to avoid the duplication of the explanation. The first sub lens array section LA1 comprises a plurality of element lenses EL11, EL12, and EL13. The element lenses EL11 and the like are rotationally symmetrical to their optical axes AX11 and the like. The element lenses EL11 are arranged in a row in the x direction (the direction which the cylindrical lens 3 does not have refractive power).

The first sub lens array section LA1 and the second sub lens array section LA2 are positioned so that the optical axis AX11 of the element lens EL11 of the first sub lens array section LA1 matches the optical axis AX21 of the element lens EL21 of the first sub lens array section LA2. E12 etc are disposed similarly.

Returning to FIGS. 1A and 1B, a condenser lens 5 is provided on the image side of the lens array 4. The lens array 4 and the condenser lens 5 constitute an image formation system. The image formation system forms an image of the linear image, made on the intermediate image-forming face I1 by the cylindrical lens 3, on a illuminated face (processing face) I2 on a glass substrate G. That is, the position of the linear image made by the cylindrical lens 3 functions jointly with the position of the illuminated face I2.

The optical system comprising the lens array 4 and the condenser lens 5 is an image formation system which also converts the linear image having nonuniform illumination, formed on the intermediate image-forming face I1 by the cylindrical lens 3, to a linear image having uniform illumination on the illuminated face I2, which is the final image face. The principle of creating a linear image with uniform illumination distribution on the illuminated face I2 is the same as the principle of a fly-eye lens used in the conventional uniform illumination described above. That is, the lens array 4 splits the light from the linear image formed by the cylindrical lens 3 on the intermediate image-forming face I1. In this embodiment, the light is split by the three element lenses EL11, EL12, and EL13. The condenser lens 5 reconnects the split linear image on the illuminated face I2. As a result, a linear image with uniform illumination can be obtained by averaging the linear images corresponding to the element lenses.

Subsequently, the process of making the illumination uniform by reconnection will be explained in greater detail based on FIGS. 1A and 1B.

As shown in FIG. 1A, a bundle of parallel rays L are radiated to the lens array 4 in the x direction in which the cylindrical lens 3 has no refractive power in. The light is focused at focusing positions P1, P2, and P3, corresponding to the element lenses. As shown in FIG. 1B, the focal point of the cylindrical lens 3 and the focal point of the lens array 4 are in approximately matching positions in the y direction in which the cylindrical lens 3 has the refractive power. Consequently, the light which has been focused by the cylindrical lens 3 is converted by the lens array 4 to an afocal parallel bundle of rays. As shown in FIGS. 1A and 1B, the rays are focused into linear shapes at the focal positions P1, P2, and P3, and pass via the condenser lens 5 to reconnect and form images at the same positions on the illuminated face I2 on the glass substrate G.

The illumination distribution of the linear image on the illuminated face I2 is a combination of the illumination distribution of the three lights, split by the element lenses EL11 and the like of the lens array 4. For example, the linear image on the illuminated face I2, made by light which has passed through the element lenses EL11 and EL12, is an image of one-third L1 of the linear image formed on the intermediate image-forming face I1 by the cylindrical lens 3. The linear image on the illuminated face I2, made by light which has passed through the element lenses EL12 and EL22 on the optical axis AX, is an image of one-third L2 of the linear image formed on the intermediate image-forming face I1 by the cylindrical lens 3. The linear image on the illuminated face I2, made by light which has passed through the element lenses EL13 and EL23, is an image of one-third L3 of the linear image formed on the intermediate image-forming face I1 by the cylindrical lens 3. Therefore, it can be understood that the illumination distribution of the linear image, formed on the illuminated face I2 by the lights which were split into three by the lens array 4, combines the different illumination distributions of the ray bundles L1, L2, and L3.

The illumination distribution of the linear image, formed on the intermediate image-forming face I1 by the cylindrical lens 3, is symmetrical to the optical axis AX. Consequently, as shown in FIG. 1A, when the linear image is split into three, the illumination distributions of the linear images formed by the element lenses EL11 and EL13, which are provided at the two ends farthest from the optical axis AX of the lens array 4, are asymmetrical to each other. Therefore, when the three split linear images are overlapped on the illuminated face I2, the illumination distribution becomes averaged, obtaining an illumination distribution with extremely high uniformity.

Incidentally, although this embodiment describes an example using three element lenses, the same results can be obtained when only two lenses are used. Alternatively, if more element lenses are provided to increase the number of split beams, it is possible to improve the averaging effect and to achieve a linear image with uniform illumination distribution.

Subsequently, the image-forming capability (aberration) required to form a linear image having a narrower width will be explained.

The linear image made by the cylindrical lens 3 is reproduced on the illuminated face I2 by an optical system comprising the lens array 4 and the condenser lens 5. Therefore, the cylindrical lens 3, the lens array 4, and the condenser lens 5 are sources of aberration.

Since the light radiated to the cylindrical lens 3 is parallel light having only one radiation direction, aberration generated by the cylindrical lens 3 simply corresponds to the spherical aberration of the cylindrical lens 3. Therefore, the aberration of the cylindrical lens 3 can be easily corrected by combining two concavo-convex cylindrical lenses, in the manner of a conventional axis-symmetrical optical system.

As already mentioned, the optical system comprising the lens array 4 and the condenser lens 5 constitutes an image formation system. Therefore, the aberration of this entire image formation optical system must be corrected. When correcting the aberration of the entire image formation optical system, the amount of aberration generated by the lens array 4 becomes problematic.

As already mentioned, the lens array 4 has the same function as a fly-eye lens used in uniform illumination. For unavoidable structural reasons, each of the individual element lenses of the conventional fly-eye lens comprise a single lens component. Consequently, when the element lens EL11 and the like of the lens array 4 each comprise a single lens component, the aberration of the lens is considerable. Accordingly, an attempt is made to correct the aberration of the lens array 4 by using the condenser lens 5. However, it is extremely difficult to correct the aberration of the element lens EL11 and the like, which are arranged in a row. As shown in FIG. 1A, the light emitted from the lens array 4 forms linear images as it is radiated to the condenser lens 5. The lights emitted from the element lenses of the lens array 4 enter the condenser lens 5 at different heights. However, since the shape of the aberration generated by each element lens is the same, the same aberration shape must be corrected in each of the light beams passing along different optical paths at the condenser lens 5. This type of aberration correction is extremely difficult.

The aberration of the lens array 4 can be sufficiently corrected by using two doublet lenses (the first sub lens array LA1 and the second sub lens array LA2) to form the lens array 4, as in this embodiment. When the two-doublet lens array 4 is combined with the condenser lens 5, wherein aberration has been sufficiently corrected, the optical system comprising the lens array 4 and the condenser lens 5 has sufficient image formation capability. Therefore, it becomes possible to reproduce in detail the linear images, created by the lens array 4, on the illuminated face I2. It is clear that the correction of the aberration of the condenser lens 5 is made easy by the fact that this is a conventional axis-symmetrical optical system.

In this embodiment, the lens array 4 can easily be comprised by doublet lenses since the lens array 4 of this embodiment is arranged in one dimension, unlike the conventional fly-eye lens, which has a two-dimensional arrangement. In the case of a one-dimensional lens array, the lenses can be supported from the lens side face, making them easier to support even when each lens comprises two lenses. In addition, the lens array can be shifted in the y direction which the element lenses are arranged in (the direction of the refractive power of the cylindrical lens 3). This eliminates aberration caused by alignment of the lenses in the width direction (y direction) of the linear image.

This embodiment allows the use of the one-dimensional lens array since, as already mentioned, this invention specializes in reducing the width of the line, by giving priority to uniform illumination of the linear image parallel to the length of the line while sacrificing uniformity parallel to its width. The above description clearly confirms that the decision of this invention is correct.

The image formation capability can be further increased by provided four element lenses in the lens array 4, although this increases the cost.

Preferably, this embodiment should have a first moving mechanism MV1 for moving the cylindrical lens 3 along the optical axis AX, a second moving mechanism MV2 for moving the lens array 4 along the optical axis AX, and a third moving mechanism MV3 for moving the condenser lens 5 along the optical axis AX. This makes it possible to change the positions of the lenses 3, 4, and 5, defocusing the image and changing the line width of the linear image. Of course, it is acceptable to move only one of the lenses instead.

Second Embodiment

Figure 2:
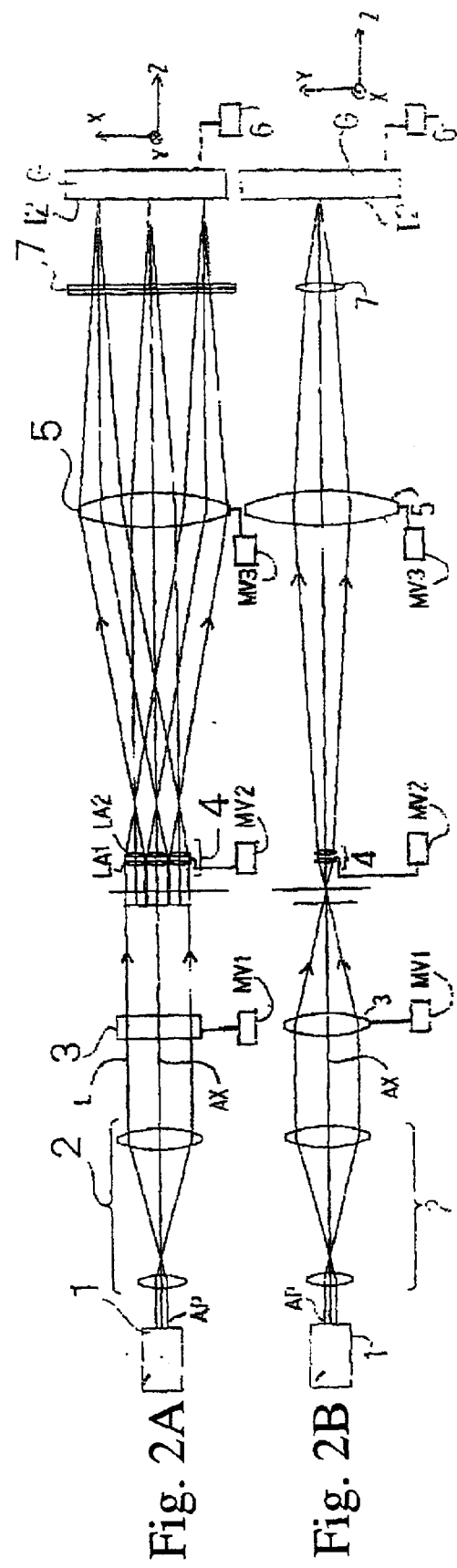
FIGS. 2A and 2B are views showing the schematic constitution of a laser processor according to a second embodiment.

FIGS. 2A and 2B show the schematic structure of a laser processor according to a second embodiment. A cylindrical lens 7 has positive (convex) power, and is newly appended between the condenser lens 5 and the illuminated face I2. Since the constitution is otherwise identical to that of the first embodiment, the same reference codes are used for the same parts and the explanation of these parts is not repeated.

In the second embodiment, the linear image made by the cylindrical lens 3 is reformed on the illuminated face I2. That is, the linear image made by the cylindrical lens 3 functions jointly with the illuminated face I2. Consequently, in comparison with the first embodiment, the position of the linear image made by the cylindrical lens 3 (intermediate image-forming face) is defocused toward the lens array 4.

The cylindrical lens 7 enables the focal length in the width direction of the linear image to be changed more freely when setting the lenses.

With regard to the line width of the linear image, the focal length in the line width direction (y direction) is important for the emission characteristics and the like of the laser light source 1. Generally, light from the laser light source 1 should ideally comprise parallel rays of light, radiating in a fixed direction. Actually, however, light from the laser light source 1 is not completely parallel. There is variation over time in the direction of the light generated from the light source 1.

Subsequently, the effect of such characteristics of the light source 1 on the capability of the optical system in the laser processor of this invention will be explained. For example, it is assumed that the light radiated from the light source 1 is not completely parallel, but has a twisted wave face and an aberration slope angle of zero degrees. Reference symbol f represents the focal length of the optical system from the aperture AP of the light source 1 to the illuminated face I2 at this time. The aberration of the laser light is the horizontal aberration f–0 on the illuminated face I2. As a result, the line width of the linear image on the illuminated face I2 increases by f–0.

Similarly, V represents variation in the emission angle of the beam from the light source 1. Variation in the position of the linear image on the illuminated face I2 is f–V. In order to reduce the effects of disorder in the wave face of the laser light, the focal length of the optical system should preferably be short. However, when the focal length of the optical system is short, it becomes difficult to maintain the working distance. As a consequence, it becomes difficult to satisfy mechanical restrictions. It is essential to set the focal length to an optimum value at the time of setting the optical system.

When changing the focal length in the first embodiment, it is necessary to change either the magnification of the image formation optical system comprising the lens array 4 and the condenser lens 5 (the magnification from the lens array 4 to the illuminated face I2) or the focal length of the cylindrical lens 3. However, the lens array 4 and the condenser lens 5 form an optical system which is symmetrical to the optical axis AX. Consequently, when the magnification of the image formation optical system is changed in order to change the focal length in the x direction of FIG. 1A, the length of the linear image formed on the illuminated face I2 changes at the same time. Furthermore, when the focal length of the cylindrical lens 3 has been changed, the number of apertures (NA) of the lights radiated to the lens array 4 changes. When the focal length from the light source 1 to the illuminated face I2 is shortened, the NA increases. For this reason, aberration generated at this time is difficult to correct, and the aberration generated by the lens array 4 increases.

Accordingly, by adding the cylindrical lens 7 between the condenser lens 5 and the illuminated face I2 as in this embodiment, even when the focal lengths of the cylindrical lens 3, the lens array 4, and the condenser lens 5, have been selected with priority given to aberration correction, the total focal length can be set by the cylindrical lens 7. Therefore, an optical system can be obtained which accords with the characteristics of the light source 1, while keeping the length of the linear image constant and without increasing aberration.

Third Embodiment

FIGS. 4A and 4B show a schematic constitution of the laser processor according to the third embodiment. A YAG laser 101 emits a laser beam which is substantially circular in cross-section, and a beam expander 102 converts the beam to collimate light which is elliptical in cross-section. At this time, the long axis of the ellipse is in the x direction, and its short axis is in the y direction. The structure of the beam expander 102 and the method of converting the cross-sectional shape of the beam will be explained later.

Subsequently, the beam enters a trapezoid prism 103 and is split into three beams radiating in different directions. The split direction matches the long direction (x direction) of the elliptical beam. The three split beams are radiated to a cylindrical lens 104. The cylindrical lens 104 has positive refractive power in the y direction, which intersects the x direction at a right angle. The shape and position of the trapezoid prism 103 are determined so that the three split beams reconnect on an intermediate image-forming face I101. The focal position of the cylindrical lens 104 also matches the position on the intermediate image-forming face I101. Therefore, the beams emitted from the cylindrical lens 104 are gathered in a linear shape on the intermediate image-forming face I101, reconnecting to form a linear image.

By averaging the three split linear images, the linear image, which is formed on the intermediate image-forming face I101, has a more uniform illumination than when directly reconnecting the beam L (hereinafter termed "raw beam") immediately after emission from the light source 101. Then, an expanding optical system 105 projects an expansion of the linear image of the intermediate image-forming face I101 onto an illuminated face I102 on a glass substrate. In this way, a linear image having uniform illumination is formed on the illuminated face I102. Preferably, an aperture should be provided in the intermediate image-forming face I101 in order to cancel the effects of diffraction at the trapezoid prism and flares.

Subsequently, uniformity of the linear image on the intermediate image-forming face I101 will be specifically and quantitatively explained.

Firstly, the intensity distribution of light when the raw beam is focused into a linear shape by an ideal cylindrical beam will be explained based on FIGS. 6A to 6E. FIG. 6A shows the cross-sectional shape of an aperture AP, which the raw beam passes through, as viewed from the direction of the optical axis AX (z direction). The aperture AP is circular in cross-section and has a diameter of $\phi$. FIG. 6B shows illumination distribution when the raw beam has passed through the aperture AP and has been focused into a linear shape. The illumination distribution shown in FIG. 6B assumes that the illumination distribution of the beam aperture AP has Gauss distribution as in a conventional laser, and is calculated from the following equation.

$$I(x) \alpha \int_0^{\sqrt{1-x^2}} \exp\{-2(x^2 + y^2)\} dy$$

Here, the x and y coordinates represent coordinates on the laser aperture AP face, as shown in FIG. 6A. The x direction is parallel to the long side of the linear image, and the y direction is parallel to the width of the linear image. As is clear from the above equation, the intensity of the light at position x0 on the linear image of FIG. 6B is equivalent to an integral of the illumination distribution within the aperture AP, passing the position x0 on the beam aperture AP of FIG. 6A and extending parallel to the y axis along a straight line LL. The diameter $\phi$ of the beam is in the range that the intensity distribution of the light reaches $1/e^2$ of the center, as in a conventional case. As is clear from FIG. 6B, the intensity distribution of the linear image is highest at the center of the linear image (x=0) and decreases as it approaches the peripheral portion. Intensity becomes zero at the outermost peripheral portions.

Next, the illumination distribution of the light which was split into three beams by the trapezoid prism and then focused into a linear shape is explained. The illumination distribution can be regarded as the illumination distribution when the beam, which was focused into the linear shape, is split into three and subsequently reconnected. The illumination distribution of the three split beams is equivalent to splitting the illumination distribution shown in FIG. 6B into three. The three split beams are termed a first beam L101, a second beam L102, and a third beam L103 (see FIG. 7). FIG. 6C shows the illumination distributions of these three split beams. The beams L101, L102, and L103 are reconnected on the intermediate image-forming face I101 as shown in FIG. 6D. As a result, the final illumination distribution has the shape shown in FIG. 6E. As is clear from FIG. 6E, the illumination distribution of the linear shape after reconnection has extremely high uniformity. A comparison of FIGS. 6B and 6E shows that the effect of the reconnection is considerable. For example, when the illumination at the center (x=0) of FIG. 6E is regarded as 100%, the illumination at the outermost peripheral portions is approximately 90%.

As already mentioned, the linear image formed on the intermediate image-forming face I101 has much more uniform illumination than when the raw beam is focused into a linear image without being split. However, there are cases when even a linear image with such highly uniform illumination does not satisfy the specifications required by the actual laser processor. In such cases, by controlling the aberration of the expanding optical system 105, the illumination at the center of the linear image can be reduced, and the illumination at the peripheral portions can be further increased. For example, this can be achieved by giving the bend aberration of the expanding optical system 105 a negative value. As a result, the illumination uniformity can be increased by several percent.

Preferably, an iris (unillustrated) should be provided in the intermediate image-forming face I101 in order to eliminate flares caused by unwanted emission from a lens or a cylinder, and flares generated at the split prism aperture, which prevent uniform illumination on the illuminated face I102.

Subsequently, the image formation capability of the optical system according to this invention will be explained. As mentioned in the description of the related art, high image formation capability is required in order to form a detailed image, and the aberrations of the optical system must be corrected successfully. From this point of view, in the present embodiment, the lights are focused in a line on the intermediate image-forming face I101, and then the expanding optical system 105 forms the image a second time. The main sources of aberration in the optical system are the cylindrical lens 104, which focuses the light on the intermediate image-forming face I101, and the expanding optical system 105, which forms the image a second time on the illuminated face I102. Accordingly, the correction of aberration in both must be considered. Firstly, the expanding optical system 105 is a conventional image-projecting optical system, and comprises a spherical lens which is symmetrical to the optical axis AX. Aberration can be correct by using conventional correction procedures, whereby highly precision aberration correction can be achieved.

As described above, the illumination uniformity of the linear image on the illuminated face I102 is corrected by controlling warp aberration in the expanding optical system 105. Warp aberration is easier to control than aberration of the image caused by spherical aberration and the like. Therefore, there is no reason why this should make it difficult to correct aberration (spherical aberration which affects the image). With regard to work processing, since the expanding optical system 105 is symmetrical to the optical axis AX, an optical system of adequate specification can be obtained by using conventional work processes.

Subsequently, returning to FIG. 7, aberration of the cylindrical lens 104 will be explained. The cylindrical lens 104 simply focuses a bundle of parallel rays, split into three by the splitting prism 103, into a line. Therefore, there is no difficulty in correcting its aberration.

Since the three bundles of rays L101, L102, and L103 enter the cylindrical lens 104 at different entry angles, the aberration generated here is, of course, dependent on the entry angle. The directions of the two light beams L101 and L103 which do not travel parallel to the optical axis AX are symmetrical to the optical axis AX. Therefore, one need only consider the beam L102, which travels in the direction of the optical axis AX, and the beam L101 (and L103) which travels in another direction.

The aberrations which depend on the entry angles are the same as what are known in axis-symmetrical optical system terminology as coma aberration and sagittal image-surface curvature, and the like. Therefore, aberration which is dependent on the entry angle can easily be corrected by analogy with an axis-symmetrical optical system. Furthermore, when it is acceptable to increase the size of the optical system, the angles of the two beams L101 and L103 radiated from the splitting prism 103 to the peripheral portions are made smaller, reducing the aberration which depends on the entry angle generated at the cylindrical lens 104.

In this way, this embodiment enables the aberration in the cylindrical lens 104 and the expanding optical system 105, which are considered to be the two main sources of aberration, to be easily corrected. Therefore, the overall optical system has high image-forming capability.

In this embodiment, the beam expander 102 comprises a prism, reducing the aberration of the overall optical system. As described above, an elliptical beam is radiated into the lens array 4. This has the effect of darkening the brightness in the focusing direction (y direction) of the beam which enters the cylindrical lens 104, while simultaneously increasing the diameter of the bundle of rays in the direction (x direction) of the long side of the linear image. It is not desirable to increase the brightness in the focusing direction (y direction) of the beam entering the cylindrical lens 104, since this generates greater aberration. On the other hand, when the diameter of the beam in the direction (x direction) of the long side of the linear image is too narrow, the linear image formed on the intermediate image-forming face I101 grows shorter. For this reason, the magnification of the expanding optical system 105 must be increased in order to obtain a linear image of the required length on the illuminated face I102. Consequently, an increase in the aberration of the expanding optical system 105 is undesirable.

The expansion and conversion of the raw beam to the elliptical beam in this embodiment is desirable in preventing aberration. Generally, a cylindrical lens is used to expand and convert a cross-sectionally circular raw beam to a cross-sectionally elliptical beam. However, as mentioned above, a cylindrical lens is expensive to manufacture and is difficult to work with high precision. Accordingly, this embodiment uses a prism element to expand and convert the cross-sectionally circular raw beam to the cross-sectionally elliptical beam without generating aberration.

Figure 8A:
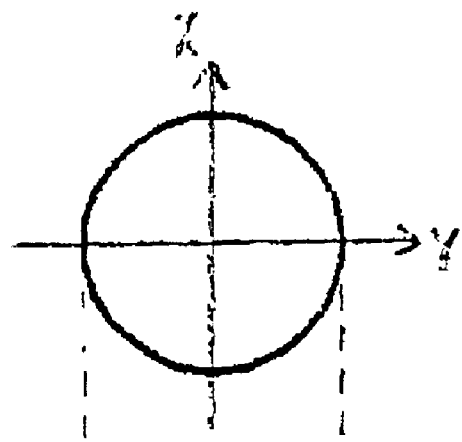
FIGS. 8A and 8B are views showing conversion of the cross-sectional shape of a beam.
Figure 8B:
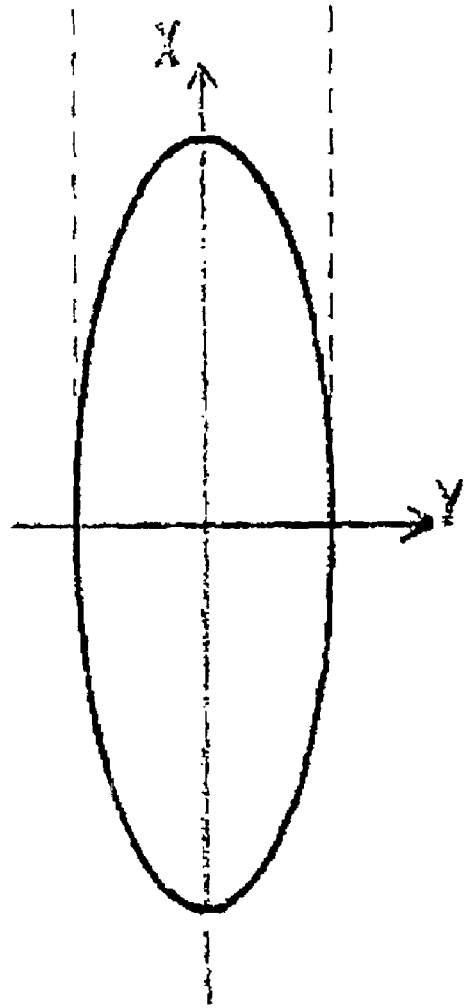

FIG. 7 shows the constitution of a beam expander 102. The beam expander 102 is comprised by combining three right-angled prisms 108, 109, and 110. The raw beam from the laser light source 101 diagonally enters the face PR1 of the prism 108, and exits the face PR2 at an approximate right angle thereto. The light, which has exited the face PR2 of the prism 108 at an approximate right angle thereto, diagonally enters the face PR3 of the prism 109, and exits the face PR4 at an approximate right angle thereto. The light, which has exited the face PR4 of the prism 109, diagonally enters the face PR5 of the prism 110, and exits the face PR6 at an approximate right angle thereto. According to this constitution, a raw beam which is circular in cross-section, as shown in FIG. 8A, is expanded and converted to light a beam which is elliptical in cross-section, as shown in FIG. 8B.

Furthermore, this embodiment should preferably comprise a first moving mechanism MV1, which moves the cylindrical lens 104 along the optical axis AX. This enables the image to be defocused by changing the position of the lens 103, thereby making it possible to change the width of the line.

This embodiment further comprises a scanning-moving section 106 which moves the glass substrate G. This enables the linear beam on the illuminated face (processed face) I102 and the illuminated face I102 to be moved relative to each other. Therefore, a large-area processed face on the substrate G can be anneal-processed at high speed.

Fourth Embodiment

FIGS. 5A and 5B show the schematic constitution of the laser processor according to a fourth embodiment. A cylindrical lens 107 has positive (concave) power, and is newly appended between the expanding optical system 105 and the illuminated face I102. Since the constitution is otherwise identical to that of the first embodiment, the same reference codes are used for the same parts and the explanation of these parts is not repeated. According to this arrangement, the image-formation relationship parallel to the width of the linear image is different from that in the first embodiment, in that the intermediate image-forming face I101 does not function jointly with the illuminated face I102. As a consequence, the cylindrical lens 104 is moved parallel to the optical axis AX in order to focus the beam into a linear shape on the illuminated face I102, and the focal point is moved from the intermediate image-forming face I101 to the face I112 in FIG. 5B. Viewed in the width direction (y direction), the position of the face I112 has the same function as the position of the illuminated face I102. According to this constitution, the linear images formed by the cylindrical lens 104 and the expanding optical system 105 are condensed parallel to their width by the cylindrical lens 107. As a result, the aberration is condensed, enabling a more detailed linear image to be formed on the illuminated face I102.

Furthermore, the above constitution is extremely effective in preventing disorder of the wave face of the laser light, and disorder in the direction of emission. Generally, light from a laser light source comprises parallel rays of light, radiated in a fixed direction. Actually, however, light from the laser light source is not completely parallel. Moreover, there is variation over time in the direction of the light generated from the light source. Consequently, the linear image on the illuminated face I102 becomes too wide, and the position of the entire image moves on the illuminated face I102. When f represents the focal length of the optical system in the direction of the width of the linear image from the aperture AP of the laser light source to the illuminated face I102, and θ represents the slope error of the wave face of the raw beam from the laser light source 101, the amount corresponding to these aberrations on the illuminated face I102 is f×θ. Furthermore, when variation in the beam emission direction is θ, the amount of this aberration is also f×θ. Thus both are proportional to the focal length f. Therefore, a short focal length in the width direction (y direction) is desirable.

In the first embodiment described above, when the optical parameters of the expanding optical system 105 are changed in order to shorten the focal length, the length of the linear image simultaneously changes. Consequently, the focal length of the entire system is made shorter by changing the focal length and position of the cylindrical lens 104. When the focal length of the cylindrical lens 104 is shortened, the number of apertures (NA) in the cylindrical lens 104 increases, and the number of apertures (NA) of light entering the expanding optical system 105 simultaneously increases. This causes considerable aberration. Accordingly, in this embodiment, the cylindrical lens 107 is added on the illuminated face I102 side of the expanding optical system 105, shortening the focal length of the linear image in the direction of its width (the y direction). According to this constitution, it is possible to provide an optical system with even more superior image formation capabilities.

Preferably, in addition to the first moving mechanism MV1 which moves the cylindrical lens 104 along the optical axis AX, this embodiment should further comprise the first moving mechanism MV2 which moves the cylindrical lens 107 along the optical axis AX. Therefore, by changing the positions of the cylindrical lens 104 and the cylindrical lens 107, it is possible to defocus the image and change the line width. Of course, it is acceptable to move only one of the lenses instead.

What is claimed is:

1. An illumination optical system comprising:

an afocal beam expander system which expands a beam illuminated from a laser light source;

a linear beam-forming lens system having at least refractive power in a second direction which is substantially at a right angle to at least a first direction, the linear beam-forming lens system converting the beam, illuminated from said beam expander system, to a linear beam having its long side in the first direction;

a lens array section having a plurality of element lenses, arranged along said first direction; and a condenser optical system which illuminates a processed face by reconnecting images of said linear beam from each of said element lenses thereon, wherein each of said linear beam-forming lens system, said lens array section, and said condenser optical system is movable respectively along an optical axis.

2. An illumination optical system according to claim 1, wherein the linear beam-forming lens system comprising a cylindrical lens having refractive power in said second direction.

3. An illumination optical system according to claim 2, wherein said cylindrical lens is movable along the optical axis.

4. An illumination optical system according to claim 1, wherein said lens array section has at least a first sub array section and a second sub array section, said element lenses are rotationally symmetrical, and said first sub array section and said second sub array section are arranged so that optical axes of said element lenses corresponding to the sub array sections substantially match each other.

5. An illumination optical system according to claim 1, said condenser optical system comprising, on the side of said processed face, another cylindrical lens having refractive power in said second direction.

6. A laser processor comprising:

a laser light source which supplies laser light;

the illumination optical system as described in one of claims 1 to 5; and a scanning-moving section which moves the linear beam on said processed face and said processed face in relation to each other.

7. An illumination optical system comprising:

a prism member which splits a beam, illuminated from a laser light source, into a plurality of light beams in a first direction and reconnects the plurality of light beams on a predetermined face;

a linear beam-forming lens system having at least refractive power in a second direction which is substantially at a right angle to said first direction, the linear beam-forming lens system converting said plurality of split light beams to a linear beam having its long side in said first direction; and an expanding optical system which expands said linear beam in said first direction, and illuminates it onto a processed face, said expanding optical system comprising a cylindrical lens, wherein each of said linear beam-forming lens system and said cylindrical lens is movable respectively along an optical axis.

8. An illumination optical system according to claim 7, wherein the prism member comprises a trapezoid prism, and the position of said predetermined face, where said plurality of light beams which were split by said trapezoid prism are connected, substantially matches the focal positions of said linear beam-forming lens system in said second direction.

9. The illumination optical system according to claim 7, wherein the expanding optical system comprising an optical system which is rotationally symmetrical to an optical axis.

10. The illumination optical system according to claim 7, wherein linear beam-forming lens system comprising a first cylindrical lens having refractive power in said second direction.

11. An illumination optical system according to claim 10, said expanding optical system comprising, on the side of said processed face, a second cylindrical lens having refractive power in said second direction.

12. An illumination optical system according to claim 11, at least one of said first cylindrical lens and said second cylindrical lens being movable along the optical axis.

13. The illumination optical system according to claim 7, further comprising a beam expander system which expands the diameter of the beam, illuminated from said laser light source, more greatly in said first direction than in second direction.

14. A laser processor comprising:

the illumination optical system according to one of claims 7 to 13;

and a scanning-moving section which moves the linear beam on said processed face and said processed face in relation to each other.

* * * * *

UNITED STATES PATENT AND TRADEMARK OFFICE
CERTIFICATE OF CORRECTION

PATENT NO. : 6,894,839 B2  
DATED : May 17, 2005  
INVENTOR(S) : Yoshikazu Sugiyama, Miyuki Masaki and Takehito Yagi It is certified that error appears in the above-identified patent and that said Letters Patent is hereby corrected as shown below:

<u>Title page,</u>  
Item [56], References Cited, FOREIGN PATENT DOCUMENTS, replace "CN   2249724   5/1997" with -- CN   1149724   5/1997 --.

Signed and Sealed this

Sixth Day of September, 2005

JON W. DUDAS  
*Director of the United States Patent and Trademark Office*